INVENTORS
EDWARD O. VANDERCOOK
DAVID D. VANDERCOOK
FRED A. FOUSER
JAMES BURTON ROOZEE
ATTORNEYS

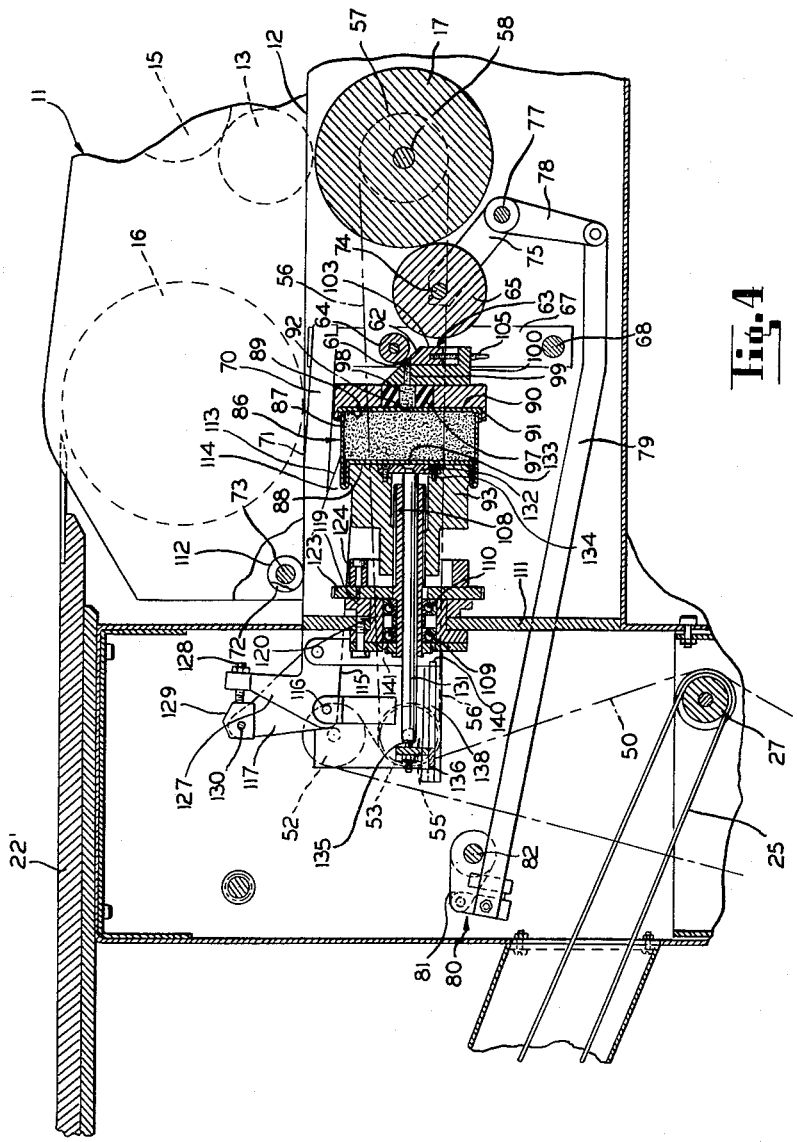

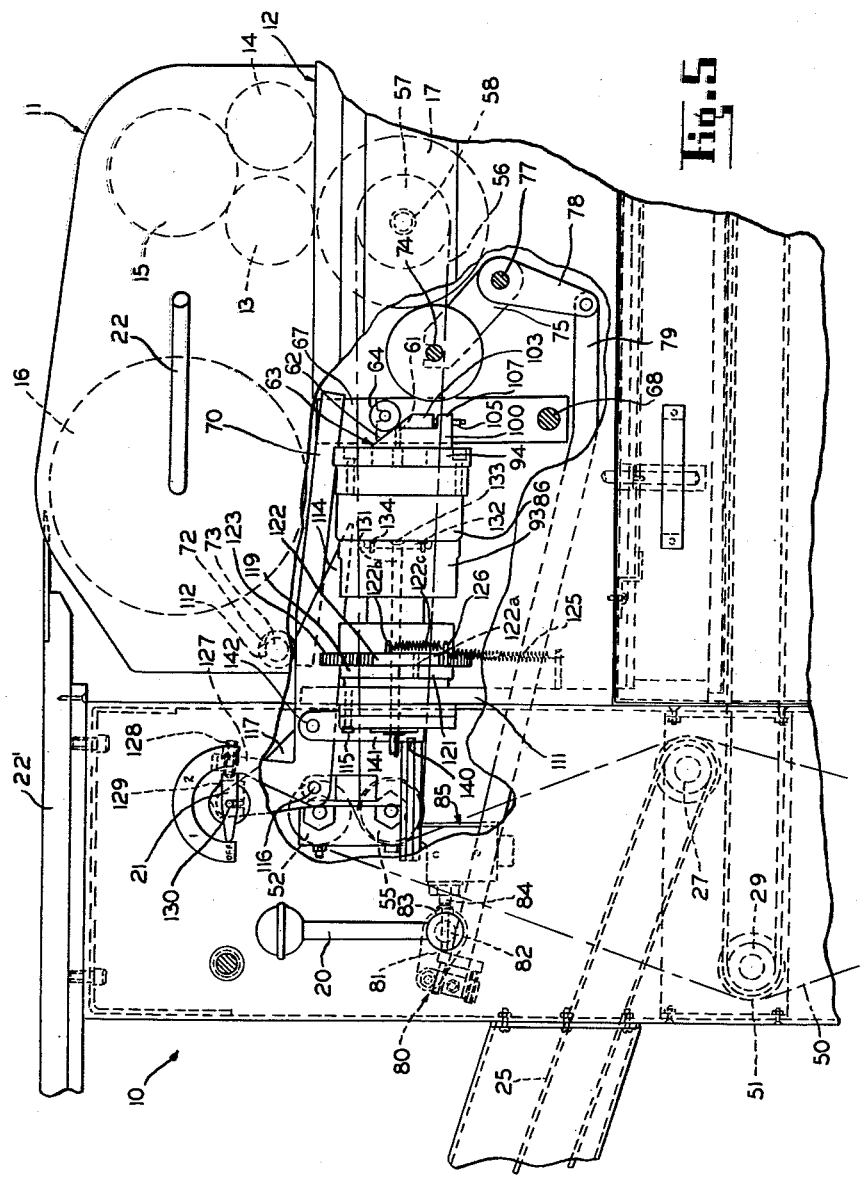

United States Patent Office 2,998,767
Patented Sept. 5, 1961

2,998,767
TEST OR PROOF PRESS
Edward O. Vandercook, Kenilworth, David D. Vandercook, Evanston, Fred A. Fouser, Chicago, and James Burton Roozee, Arlington Heights, Ill., assignors to Vandercook & Sons, Inc., Chicago, Ill., a corporation of Delaware
Filed Apr. 22, 1955, Ser. No. 503,105
1 Claim. (Cl. 101—269)

This invention relates to a test press and more particularly to a test or proof press for taking an impression from a form in advance of application of such form to a high speed production press, under conditions equivalent to the conditions under which such form will be used in the production press.

An important object of the invention is to provide an improved ink applicator arrangement for a test press or the like. A knife arrangement such as used in production presses is not suitable for test or proof presses because proper adjustment of such a knife arrangement is difficult to achieve when only a few prints are made. The present practice in proof presses is to manually apply ink with a knife, which is a time-consuming operation and requires some degree of skill.

According to this invention, the ink is in a cartridge or the like and means are provided for ejecting the ink therefrom, so that the ink can be readily applied with the quantity accurately controlled.

Ink is commercially available in cylindrical containers of the can type and another object of the invention is to provide improved methods and apparatus by which ink, or a similar substance, can be directly ejected from such a container.

According to this invention, one end wall of such a container is apertured and the other end wall is moved toward such one end wall to discharge the ink from the container, the side wall of the container being sufficiently flexible to allow folding thereof as one end wall is moved toward the other.

A further object of this invention is to provide a test press having a built-in dryer.

According to this invention, the sheets, after the printing operation, are deposited on an inclined conveyor belt at one end of the press which feeds the sheet downwardly to a second conveyor belt extending horizontally below the bed of the machine, with electric heater elements or the like disposed over a portion of the second conveyor belt to dry the sheets as they are moved by the belt. At the end of the second belt, the sheets may fall to a suitable receptacle.

By this arrangement, the dryer occupies space that was previously not utilized, and furthermore, the dryer is extremely convenient to use.

This invention contemplates other objects, features and advantages which will become more fully apparent from the following detailed description taken in conjunction with the accompanying drawings which illustrate a preferred embodiment and in which:

FIGURE 4 is a cross-sectional view taken substantially along line IV—IV of FIGURE 2; and FIGURE 5 is an enlarged side elevational view of the upper left hand portion of FIGURE 2, with certain parts broken away to illustrate the internal construction.

Figure 1:
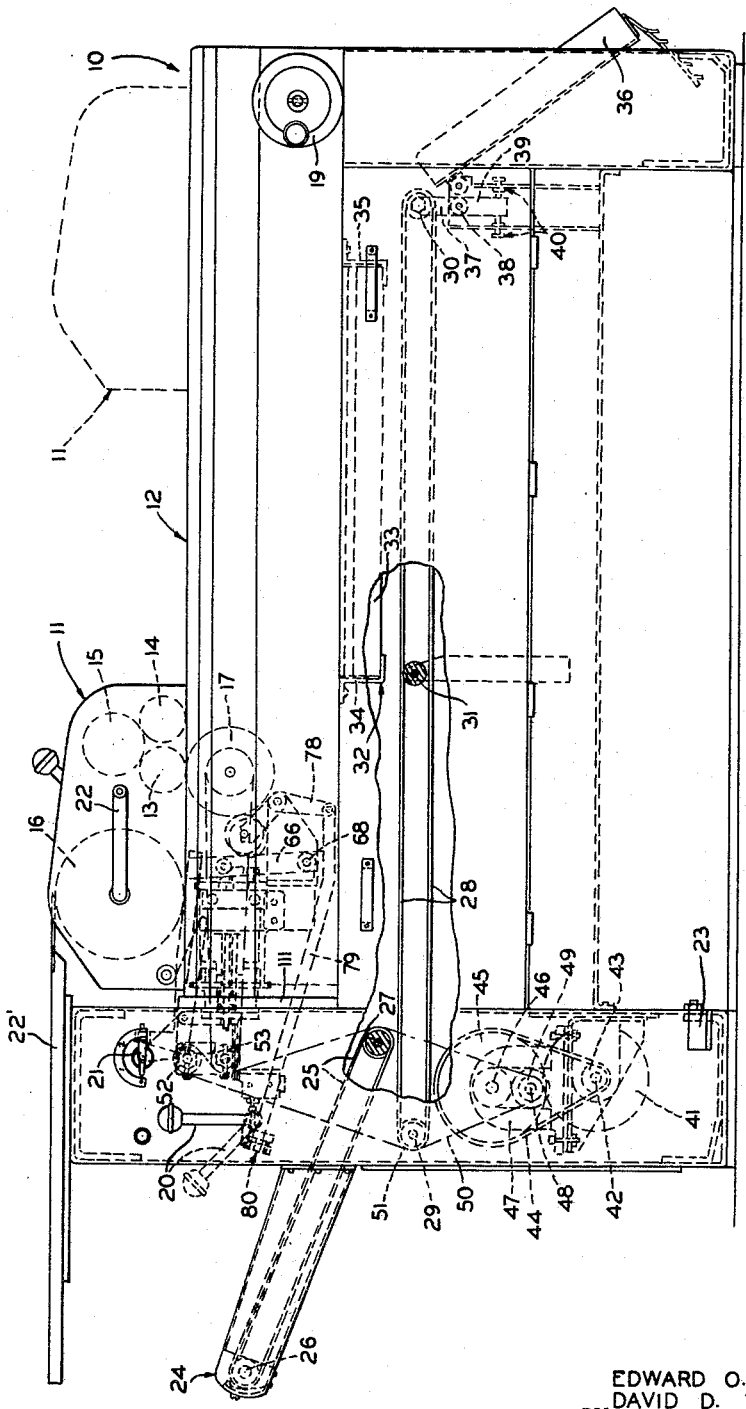
FIGURE 1 is a side elevational view of a test press constructed in accordance with the principles of this invention.
Figure 2:
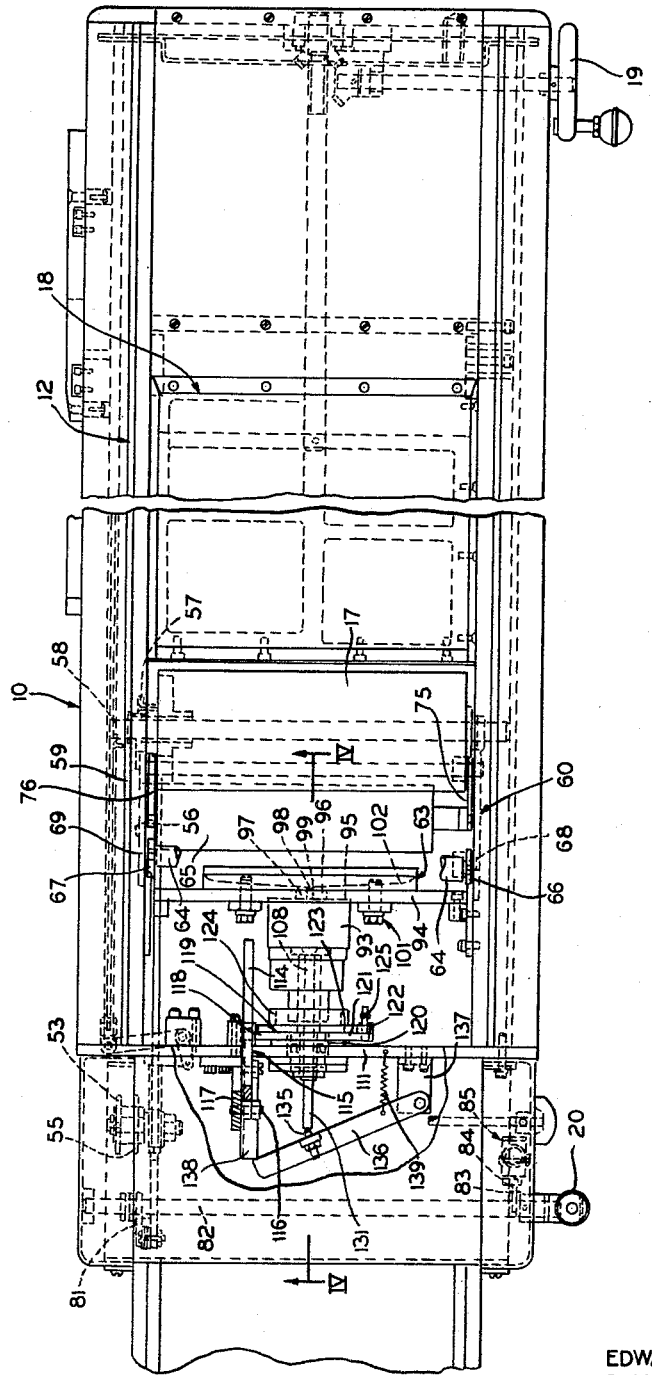
FIGURE 2 is a top plan view of the press of FIGURE 1, but with the carriage unit thereof removed.
Figure 3:
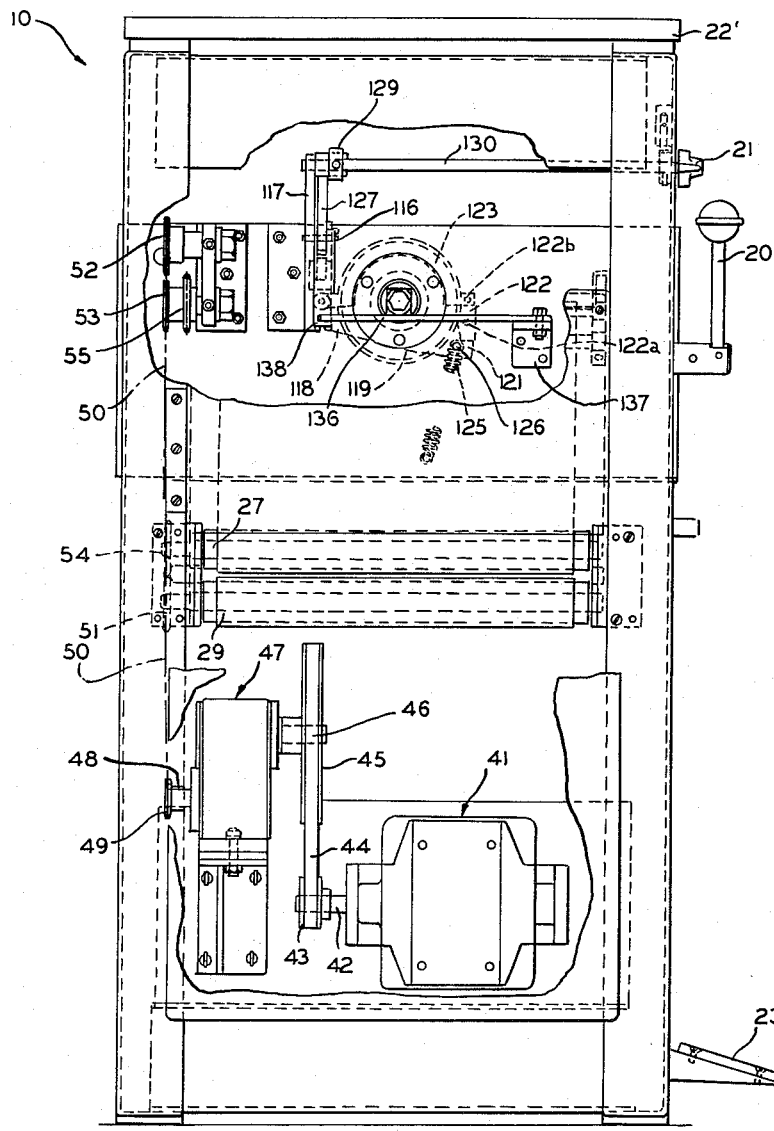
FIGURE 3 is a rear elevational view of the press of FIGURE 1.

Reference numeral 10 generally designates a test press constructed in accordance with the principles of this invention. The press 10 comprises a carriage 11 which is reciprocably movable on a horizontal bed 12 between a loading position illustrated in the full lines in FIGURE 1, and an unloading position illustrated in dotted lines.

The carriage 11 journals a pair of spaced form rollers 13 and 14, a distributor roller 15 above and in engagement with the form rollers 13 and 14, and an impression cylinder 16 behind the form rollers 13 and 14. In the loading position of the carriage 11, the form roller 13 engages an ink applicator roller 17 in the bed 12 of the press.

In operation of the press 10, a form to be tested is placed on a form support 18 in the bed 12 of the press, the position of the support 18 being adjustable longitudinally by rotation of a control wheel 19. A control lever 20 is then moved from an "off" position illustrated in dotted lines in FIGURE 1, to an "on" position illustrated in full lines in FIGURE 1 to energize drive means for an ink-applying mechanism, and also for a dryer to be described.

The ink-applying mechanism forms a highly important feature of the invention and will be described in detail hereinafter. In general, this mechanism functions to apply a certain amount of ink to the applicator roller 17 each time the carriage 11 is moved into the loading position illustrated in full lines in FIGURE 1. The amount of ink that is fed is controlled by a suitable knob 21. The roller 17 is driven and drives the form roller 13, the distributor roller 15 and the form roller 14, ink being transferred from the roller 17 to the roller 13 and from there through the distributor roller 15 to the roller 14.

After rotation of the rollers for a certain length of time, the ink will be uniformly distributed on the form rollers 13 and 14. In the initial operation of the press, it may be necessary to move the carriage forwardly and then rearwardly to its unloading position several times in order to obtain a sufficient amount of ink on the form rollers 13 and 14. This movement may be effected by rotation of a crank 22 on the carriage 11, the crank 22 being secured to the impression cylinder 16 with a gear carried by the impression cylinder 16 being engaged with a rack in the bed 12 of the press.

After the required amount of ink has been applied to the form rollers 13 and 14, a sheet may be moved from a stack of sheets on a platform 22' and an edge portion of such sheet may be clamped to the impression cylinder 16, the operation of the clamping mechanism being controllable through a foot-operated lever 23, when the carriage is in its loading position.

After the sheet is attached to the impression cylinder 16, the carriage 11 is moved forwardly to the unloading position illustrated in dotted lines in FIGURE 1, and during this movement the form rollers 13 and 14 apply ink to the form on the support 18 in the bed 12 of the press after which the sheet carried by the impression cylinder 16 is engaged with the form to print thereon. The printed sheet may then be removed from the impression cylinder 16, and the carriage 11 may then be moved back to its loading position to receive another sheet, after which the operation is repeated.

The construction of the carriage 11, the construction of the sheet-clamping mechanism, and the construction of the form support and control mechanism therefor are not illustrated and described in detail herein, because such are known in the art and by themselves form no part of the present invention. According to an important feature of the invention, a dryer is incorporated in the test press 10 so that after a sheet is removed from the impression cylinder 16, it can immediately be dried. According to this feature, a sheet to be dried is dropped through an opening in an upper surface of a housing 24 disposed below the rearward end portion of the platform 22'. The sheet engages a downwardly-inclined conveyor belt 25 which is trained on a pair of rollers including a roller 26 journalled in the outer end portion of the housing 24, and a roller 27 in the main body of the press. The roller 27 is driven and the sheet will move from the conveyor belt 25 onto a horizontal conveyor belt 28 which extends below the bed 12 of the press and which is trained on a roller 29 rearwardly spaced with respect to the roller 27, a roller 30 at the forward end of the press, and a roller 31 intermediate the rollers 29 and 30. The roller 29 is driven in a direction such that the sheet is carried forwardly by the conveyor belt 28 below a dryer 32. The dryer 32 may comprise at least one and preferably a plurality of tubes 33 of glass or a similar material, coated with an electrical resistance material, through which an electrical current is passed, a very even heating being possible with such tubes. The tubes 33 may be supported between brackets 34 and 35 which depend from frame structure of the bed 12.

The dried sheets drop from the forward end of the conveyor belt 28 into a receptacle 36, from which they may be manually removed.

To adjust tension in the conveyor belt 28, the forward roller 30 may be journalled between a pair of arms 37 on a shaft 38 having an arm 39 secured thereto which is adjustable by adjustment of screws 40.

To drive the conveyor drive rollers 27 and 29, an electric motor 41 is supported therebelow which has a drive shaft 42 carrying a pulley 43, with a belt 44 trained on the pulley 43 and a larger pulley 45 secured on an input shaft 46 of a speed reduction unit 47 having an output shaft 48 to which a sprocket wheel 49 is secured. A chain 50 is trained about and meshes with the sprocket wheel 49 and extends upwardly from one side thereof about a portion of a sprocket wheel 51 drivingly secured to the roller 29, thence upwardly about an idler sprocket wheel 52, thence downwardly about a portion of an idler wheel 53, arranged to drive the ink applicator mechanism in a manner as will be described, thence downwardly about a portion of a sprocket wheel 54 drivingly secured to the conveyor roller 27, thence downwardly to the sprocket 49.

A sprocket wheel 55 is drivingly secured to the sprocket wheel 53 and a chain 56 meshed therewith is meshed with a sprocket wheel 57 which is drivingly secured to the applicator roller 17, the roller 17 and sprocket 57 being journalled by means of a shaft 58 between a pair of spaced parallel vertical plates 59 and 60.

Accordingly, both the drier mechanism and the ink applicator mechanism are driven from the common motor 41.

The ink applicator mechanism includes a feeding arrangement (to be described in detail) which is arranged to force ink out through a narrow slit 61 in an inclined face 62 of an ink distributing and control unit 63. When the carriage 11 is in its loading position, a transfer or ductor roller 64 is engaged with the face 62 of the unit 63 over the slit 61 to receive ink therefrom, and when the carriage 11 is moved forwardly out of its loading position, the ductor roller 64 is moved over into engagement with a vibrator roller 65 which is engaged with the applicator roller 17 at all times during operation of the machine. The vibrator roller 65 is driven by engagement with the applicator roller 17 and the ductor roller 64 is driven by engagement with the vibrator roller 65, ink being transferred from the ductor roller 64 to the vibrator roller 65 and from the vibrator roller 65 to the applicator roller 17, to be transferred to the form rollers 13 and 14 on the carriage 11, when the carriage is in its rearward loading position.

The ductor roller 64 is journalled between a pair of arms 66 and 67 which are affixed to a common shaft 68 journalled between the plate 60 and an upright plate 69 inside the plate 59. A bar 70 is rigidly affixed, as by welding, to the upper end of the arm 67 and has a surface 71 in the path of a roller 72 journalled on a shaft 73 at the rearward end of the carriage 11, the bar 70 being depressed when the carriage is moved rearwardly into its loading position, as shown in full lines in FIGURE 1, to move the ductor roller 64 into engagement with the surface 62 over the slit 61. The ductor roller 64 is normally biased away from the unit 62 and into engagement with the vibrator roller 65 by a suitable spring, not shown, which acts upon the arm 66.

The vibrator roller 65 is supported on a shaft 74 and a connection is provided between the vibrator roller 65 and the shaft 74 which will effect reciprocable axial movement of the roller 65 as it is rotated. Such connections are well known in the art and may for example comprise a double helical groove on the shaft 74 with a follower carried by the roller 65 engaged in such groove.

Both the ductor roller 64 and the applicator roller 17 may be of steel or the like having a hard surface, and to promote uniform distribution of ink, the vibrator roller 65 preferably has a resilient surface of rubber-like material. Such materials are subject to "cold flow" and when the machine is not operating, it is desirable that the vibrator roller 65 be out of engagement with the applicator roller 17. For this reason, the shaft 74 is carried between a pair of arms 75 and 76 affixed to the shaft 77 which is journalled between the plate 60 and the plate 69. The shaft 77 carries an arm 78 which is pivotally connected to the forward end of a link 79, the rearward end of the link 79 being pivotally connected through a suitable coupling 80 to an arm 81 carried by a shaft 82, to which the control lever 20 is secured. When the control lever 20 is in its "on" position as shown in full lines in FIGURE 1, the vibrator roller 65 will be engaged with the applicator roller 17, but when the lever 20 is moved to its "off" position illustrated in dotted lines in FIGURE 1, the vibrator roller 65 will be moved out of engagement with the applicator roller 17.

As previously indicated, the control lever 20 may also effect energization of the machine and, for this purpose, it carries an actuator 83 engageable with an actuating button 84 of an electric switch 85 which controls energization of the electric motor 41.

The mechanism for feeding ink out through the slit 61 of the ink distributing and control unit 63 is a highly important feature of the present invention. In this mechanism, the ink supply is in a chamber which is preferably defined by a conventional generally cylindrical ink container 86 having a cylindrical side wall 87, a rearward end wall 88 and a forward end wall 89 which may be part of a conventional cover 90 having an annular flange portion 91 embracing the forward end portion of the side wall 87.

The ink supply chamber communicates with the slit 61, preferably through a central aperture 92 punched in the end wall 89 and to feed ink, the volume of the chamber is reduced, preferably by forcing the rearward end wall 88 toward the forward end wall 89. In this operation, the side wall 87 of the container 86 is folded in, the side wall of a conventional metallic ink can being sufficiently flexible for this purpose.

To move the rearward end wall 88 forwardly, a pressure-applying head 93 may engage a substantial portion of the outer surface of the rearward end wall 88, the peripheral edge of the head 93 being preferably spaced inside the outer surface of the side wall 87 by a distance slightly greater than twice the thickness of the side wall 87 so as to achieve uniform folding of the side wall without forming longitudinal creases and the like.

To support the forward end of the container 86 as the rearward end wall 88 is moved forwardly, an upright transversely extending plate 94 is secured between the frame plate 60 and 69 and has a recess 95 in a central portion of its rearward surface for receiving the forward end of the container 86. The plate 94 at the central portion of the recess 95 is provided with an opening 96 in which a washer-like plug 97 is disposed, the plug 97 having a central opening 98 arranged to register with the aperture 92 in the forward end wall 89 of the container 86. The plug 97 is preferably of a resilient material such as a rubber-like material and with the container 86 removed, the rearward surface of the plug 97 should project rearwardly to a certain extent from the face of the recess 95 so that when the container 86 is disposed in position, the plug 97 may seemingly engage the surface of the end wall 89 about the aperture 92.

At its forward end, the aperture 98 of the plug 97 communicates with an opening 99 in a member 100 secured against the forward face of the plate 94, by means of bolts 101. The member 100 is part of the ink feeding control unit 63 and has a groove 102 communicating with the passage 99 and extending transversely with respect to the bed of the press. The upper surface of the member 100 is inclined to form part of the surface 62 of the unit 63 and this upper surface and the upper inside surface of the groove 102 converge to an edge which defines the upper edge of the slit 61.

A feed control member 103 is secured against the forward surface of the member 100 and has an inclined upper surface forming part of the surface 62, this inclined upper surface of the member 103 and the rearward surface of the member 103 being converged to an edge defining the lower edge of the slit 61. With this arrangement, the width of the slit 61, and thus the feeding of ink may be controlled by vertical movement of the control member 103. For this purpose, a plurality of thumb screws 115, preferably three, extend upwardly and are threaded through a flange portion 107 of the member 100 below the control member 103, one being threaded into the control member 103 at its center, and others being threaded into the control member 103 adjacent the ends thereof. Compression springs, not shown, are disposed between the flange portion 107 of the member 100 and the control member 103 to urge the member 103 upwardly, the member 103 being movable downwardly by rotation of the screws 104, 105 and 106. With this arrangement of a plurality of screws, the width of the slit 61 may be adjusted so as to achieve a uniform feed of ink from end to end.

To force the pressure-applying head 93 forwardly to discharge ink from the container 86, the head 93 is threaded on a screw 108 which is journalled by means of bearings 109 and 110 from an upright plate 111 forming part of the frame of the press. In the initial installation of an ink container, the container is disposed with its forward end in the recess 95 of the plate 94 and with the screw 108 frictionally held against rotation, the head 93 may be rotated manually to move forwardly into engagement with the rearward end wall of the container. There will then be sufficient frictional engagement between the head 93 and the container, and between the container and the plate 94, to prevent rotation of the head 93, and the screw 108 may then be rotated to effect further forward movement of the head 93. This arrangement thus permits ready installation of an ink container, with forced feed of ink after installation.

According to this invention, means are provided for feeding a certain amount of ink in movement of the carriage 11 into and out of its rearward loading position. For this purpose, a roller 112 is journalled on the shaft 73 at the rearward end of the carriage 11 and is arranged to cammingly engage an inclined cam surface 113 of a forwardly projecting arm 114 of a lever 115 which is pivoted by means of a pin 116 on a bracket 117 secured to the rearward face of the frame plate 111.

The undersurface of the arm 114 of the lever 115 is engageable with an arm 118 of a lever 119 which is journalled on a sleeve 120 affixed to the frame plate 111 and receiving the bearings 109 and 110. The lever 119 has a second arm 121 which carries a pawl 122 engageable with the teeth of a ratchet wheel 123 keyed to the screw 108. The ratchet wheel 123 may carry a sleeve 124 in generally surrounding relation to a rearward end portion of the pressure-applying head 93. The arm 121 of the level 119 is urged downwardly by a coiled tension spring 125 secured at its lower end to the plate 111 and at its upper end to a pin 126 secured to the arm 121. The pawl 122 may be pivoted on a pin 122a and may carry a pin 122b connected to one end of a coiled tension spring 122c, the other end of the spring 122c being connected to the pin 126 with the pawl 122 being thereby urged toward the toothed periphery of the ratchet wheel 123.

In operation, the arm 114 of the lever 115 is held in a "down" position with the carriage 11 in its rearward loading position so that the arm 121 of the lever 119 is held in an "up" position against the tension of the spring 125. When the carriage 11 is moved forwardly to move the roller 112 away from the cam surface 113 of the lever arm 114, the arm 121 of the lever 119 is allowed to move downwardly under the action of the tension spring 125. In this movement, the pawl 122 will move past one or more teeth of the ratchet wheel 123.

When the carriage 11 is moved back into its rearward loading position, the arm 114 will be depressed to move the arm 121 of the lever 119 upwardly against the action of the tension spring 125, and the pawl 122 will engage a tooth of the ratchet wheel 123 and rotate the ratchet wheel 123 through a certain angle, thus completing the cycle.

According to a specific feature of the invention, means are provided for adjustably controlling the amount of feed from each movement of the carriage 11 into and out of its rearward loading position. According to this feature, means are provided for adjustably limiting movement of the lever 119 under the action of the tension spring 125 as the carriage 11 is moved forwardly to move the roller 112 away from the cam surface 113. To limit this movement, the lever 115 has a second arm 127 which carries a pin 128 engageable with a stop member 129 secured to a shaft 130, to which the control knob 21 is also secured. The stop member 129 may have a plurality of faces at different distances from the axis of the shaft 130. When the control knob 21 is in an "off" position as illustrated, the stop member 129 will so limit movement of the arm 127 of the lever 115 as to prevent drive of the ratchet wheel 123, and thus prevent actuation of the pressure-applying head 93. With rotation of the control member 121 in a clockwise direction, as viewed in FIGURE 1, a different face of the stop member 129 will be in the path of the arm 127 to permit greater movement of the arm 127 to obtain a greater angle of rotation of the ratchet wheel 123 with each movement of the carriage 11 into its loading position, and when the control knob 21 is rotated to a position 180° from its "off" position, a maximum angular movement of the ratchet wheel 123 will be obtained with each movement of the carriage 11 into its rearward loading position, to obtain a maximum feed of ink.

According to a further specific feature of the invention, the forward movement of the pressure-applying head 93 is automatically stopped when it reaches a position just short of the plate 94, so as to prevent damage to the machine. For this purpose, a rod 131 extends axially through the screw 108 with a plate 132 secured to the forward end of the rod 131 by a screw 133 being also secured in a recess in the forward surface of the pressure-applying head 93 by screws 134. The rearward end of the rod 131 projects rearwardly beyond the rearward end of the screw 108 and engages a pin 135 adjustably secured to a lever 136 which is pivoted for movement about a vertical axis on a bracket 137 secured to the rearward surface of the frame plate 11. The free end of the lever 136 is disposed in a guide slot defined by a generally U-shaped member 138 secured to the bracket 117. The lever 136 is biased forwardly by means of a coiled tension spring 139, so as to move forwardly with the pressure-applying head 93, and when the pressure-applying head 93 reaches a position just short of the plate 94, the end of the lever 136 will be in a position to engage in a slot 140 in a member 141 which has its upper end connected by a bolt 142 to the lever 115, with the lower portion of the member 141 being guided between the forward end of the U-shaped member 138 and the rearward surface of the frame plate 111. The slot 140 is so positioned that it will be aligned with the guide slot defined by the member 138 when the lever arm 114 of the lever 115 is depressed. Accordingly, the lever 136 may engage in the slot 140 and actuation of the lever 115 will be prevented, to thus prevent actuation of the ratchet wheel 123 and prevent further drive of the head 93.

*Summary of operation*

To operate the press 10, a conventional ink container or can, full of ink of the desired color, is prepared for use by punching an aperture in the center of its cover. The carriage 11 is then moved to a position forwardly from the rearward loading position shown in full lines in FIGURE 1, and the can is placed in the position of the can 86 illustrated in the drawings, with its cover in the recess 95 of the plate 94. The pressure-applying head 93 is then rotated on the screw 108 until it firmly engages the rearward end wall (bottom) of the can. The actuating mechanism for the head 93 may then be operated, either by manually depressing the arm 114 of the lever 115, or by moving the carriage 11 back and forth into and out of the rearward loading position shown in full lines in FIGURE 1. In this operation, the control knob 21 should be rotated to a position out of the "off" position illustrated.

After actuation of the head feeding mechanism a certain number of times, the ink will begin to ooze out of the slit 61 of the feeding control unit 63. The ink distributing mechanism may then be set into operation, by throwing the control lever 20 from its "off" position illustrated in dotted lines in FIGURE 1 to its "on" position illustrated in full lines in FIGURE 1. This will engage the vibrator roller 65 with the applicator roller 17, and will also energize the drive motor 41 to drive the applicator roller 17, as well as the drive rollers 27 and 29 for the dryer conveyor belts.

The ink at the slit 61 will be transferred to the ductor roller 64 when the carriage is in its rearward loading position, and when the carriage is moved out of its rearward loading position, the ductor roller 64 will be engaged with the vibrator roller 65 so that ink will be transferred from the ductor roller 64 to the vibrator roller 65 and from the vibrator roller 65 to the applicator roller 17. From the applicator roller 17, of course, the ink is transferred to the form roller 13 and from there through the distributor roller 15 to the other form roller 14.

Through control of the carriage 11, it will be observed that ink is being transferred to the form rollers 13 and 14, and when what appears to be the required amount of ink is on the form rollers 13 and 14, the press is ready for an impression operation.

With a form to be tested disposed on the form support block 18, a sheet is taken from a stack of sheets on the platform 22 and one edge of such sheet is secured to the impression cylinder 16 by operation of the foot pedal 23. The impression cylinder 16 is then moved from the rearward loading position, shown in full lines in FIGURE 1, to the forward position shown in dotted lines in FIGURE 1, by manual operation of the crank 22. In this movement, the form rollers 13 and 14 engage the form on the support block 18 to supply ink thereto after which the sheet carried by the impression cylinder 16 is engaged with the form to take an impression therefrom.

The sheet may then be removed from the carriage 11, and disposed on the conveyor belt 25 of the dryer assembly. The sheet is transferred from the conveyor belt 25 to the conveyor belt 28, and passes under the electric heating assembly 32, after which it is deposited in the rack 36.

The carriage 11 may then be moved back to its loading position by operation of the crank 22, another sheet may be attached to the impression cylinder 16, and the operation is repeated. If it is found that too much or too little ink is being applied to the form, the control knob 21 may be adjusted to obtain the proper amount.

When the supply of ink is exhausted, the operation of the ink feeding mechanism will be automatically stopped from the engagement of the end of the lever 136 in the slot 140 of the member 141. To remove the container from the press, the carriage is moved forwardly out of its loading position, and the pressure-applying head 93 may be rotated manually on the screw 108 to move in a rearward direction and allow removal of the can, after which a new container or can may be disposed in the ink feed mechanism in the manner as above described.

It is important to note that an ink container may be removed at any time and replaced with another container. For example, if after an ink can of say black ink has been partially used, it is desired to change to say green ink, the can of black ink may be removed to be stored for future use, and replaced with the can of green ink. If it is desired to clean the ink feed control unit 63, this can be readily accomplished simply by removing the nuts of the bolts 101. The rollers of the inking mechanism are, of course, readily accessible so that they can be easily cleaned.

It will, accordingly, be appreciated that this invention provides an improved test press incorporating a built-in dryer structure and an ink feeding mechanism which is readily controlled to apply the proper amount of ink and in which the ink is fed directly from a container of conventional type.

It will be understood that modifications and variations may be effected without departing from the spirit and scope of the novel concepts of the present invention.

We claim as our invention:

In a printing press or the like, a bed arranged to receive a printing form, at least one form roller for applying ink to said form, a carriage journalling said form roller and reciprocable longitudinally of said bed, an ink applicator roller in said bed for applying ink to said form roller, a vibrator roller for applying ink to said applicator roller, ink supply means including a confined ink-supply chamber and an outlet in communication with said chamber, a ductor roller movable under control of movement of said carriage between a position in engagement with said vibrator roller and a position for receiving ink from said outlet, and means controlled by movement of said carriage for reducing the volume of said chamber to supply a controlled quantity of ink at said outlet.

References Cited in the file of this patent

UNITED STATES PATENTS

| | | |
|---|---|---|
| 692,065 | Naumann | Jan. 28, 1902 |
| 1,081,429 | Bullis | Dec. 16, 1913 |
| 1,190,779 | McClure | July 11, 1916 |
| 1,235,550 | Carmody | Aug. 7, 1917 |
| 1,503,224 | Blaine | July 29, 1924 |
| 1,707,995 | Schlotter | Apr. 9, 1929 |
| 1,758,535 | Post | May 13, 1930 |
| 1,965,596 | Kline | July 10, 1934 |
| 1,985,701 | Vandercook et al. | Dec. 25, 1934 |
| 2,143,885 | Kline | Jan. 17, 1939 |
| 2,143,886 | Kline | Jan. 17, 1939 |
| 2,471,852 | Bau | May 31, 1949 |
| 2,656,789 | Bechtold | Oct. 27, 1953 |
| 2,890,652 | Jauch et al. | June 16, 1959 |

FOREIGN PATENTS

| | | |
|---|---|---|
| 293,984 | Great Britain | July 19, 1928 |